June 24, 1941.  M. H. A. LINDSAY ET AL  2,247,246

MICRO-WAVE RADIO ALARM SYSTEM

Filed Dec. 3, 1938   3 Sheets-Sheet 1

INVENTORS
M. H. A. LINDSAY
K. WOLOSCHAK
BY
*A. A. Smith*
ATTORNEY

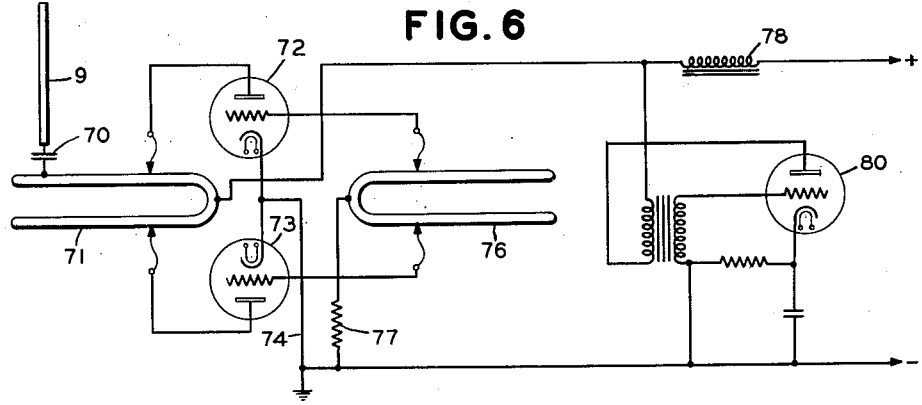
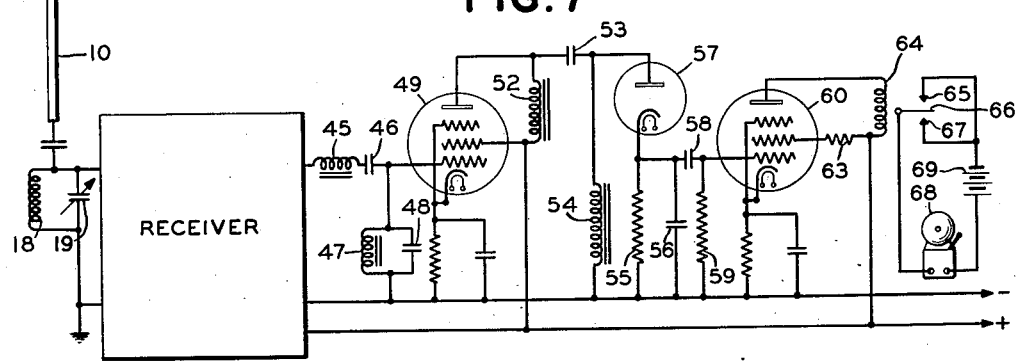
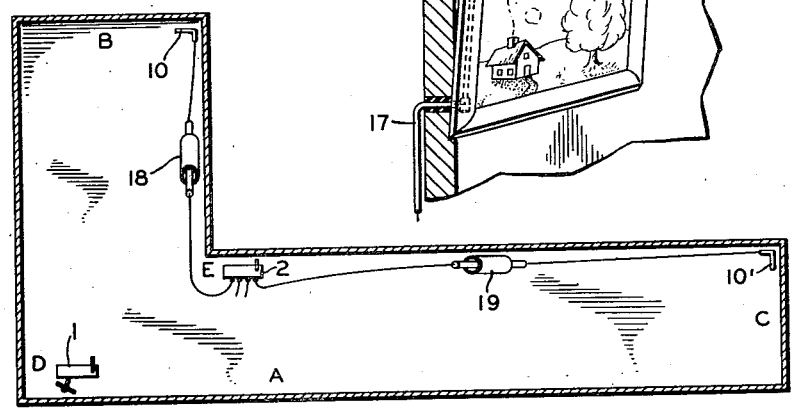

TRANSMITTING ANTENNA

RECEIVING ANTENNA

UNITS OF RADIO ENERGY

INVENTORS
M. H. A. LINDSAY
K. WOLOSCHAK
BY
ATTORNEY

Patented June 24, 1941

2,247,246

UNITED STATES PATENT OFFICE 2,247,246

MICRO-WAVE RADIO ALARM SYSTEM

Maxwell H. A. Lindsay, Summit, N. J., and Konstantin Woloschak, New York, N. Y., assignors to The American District Telegraph Company, New York, N. Y., a corporation of New Jersey Application December 3, 1938, Serial No. 243,752

15 Claims. (Cl. 177—314)

This invention relates to alarm systems generally and more particularly to a burglar alarm system or the like wherein variations of the characteristic standing wave pattern from a shortwave radio transmitter may be used for the purpose of detecting intruders and sounding alarms and the like. Such a system is particularly useful in protecting individual rooms within a building from unauthorized intrusion.

It is known to the art that radio frequency energy, when confined within a restricted space by means of suitable reflectors, distributes itself throughout the space to form a standing wave pattern. The total energy at any point in that space is equal to the algebraic summation of all the directly radiated and the reflected energy reaching that point, and this total energy remains fixed in value as long as there is no change either in the reflectors or in the amount, or the frequency, of the energy being generated.

If the wave length of the radio frequency energy is small relative to the dimensions of the confined space, there will be many points of relatively high energy level throughout the space, and many other points of low energy level, with gradations of energy level in between those points. The standing wave pattern thus formed may be either symmetrical or not, depending on the relative position of the radio frequency source with respect to the reflecting walls, the shape of the restricted space, and also the relative position of other reflectors that may be within the space.

It must be understood that objects which have very little effect on radio frequency energy of a particular wave length may be highly absorbent and very directive for energy of a much lower wave length. In reference particularly to the ultrahigh frequency radio waves at which this invention operates best, viz. of the order of about a meter or less, most common materials absorb and also reflect energy to a considerable degree. This is so much the case that a room whose floor, walls and ceiling are made of the usual building materials will confine energy of this wave length quite thoroughly, and the amount of energy reaching the exterior will be a small fraction of the energy in the room. Likewise, energy of this wave length, when generated externally to the restricted space, will be greatly attenuated while passing through the walls into the room.

If a suitable receiver and its associated antenna is placed in the room, or if the receiver is outside the room but is fed by an antenna placed within the room, a portion of the energy within the room may be picked up, amplified, and fed into some indicating or alarm device. Because of the standing wave pattern of the energy in the room, the actual amount of energy reaching the receiving antenna depends on the location of the antenna with respect to the nodes and anti-nodes of energy making up the wave pattern.

Obviously if some reflecting and/or absorbing device within the room is moved about, the whole wave pattern will change, and the amount of energy reaching the receiving antenna will vary. Since the human body is a good reflector and absorber of energy at this wave length, the entrance and moving about of a person in the room will cause variations of energy at the receiving antenna, and the resulting change in the receiver output current may be employed to actuate an alarm device.

Such an alarm system is described in its elementary form in the prior art but for actual commercial application many difficulties must be overcome before a practical system can be developed; and ordinary short-wave or micro-wave alarm apparatus shown in the prior art cannot work satisfactorily for such a purpose. It is a well-known fact to those skilled in the art that radio transmitting and receiving apparatus, operating at wave lengths in the region of a meter and less, is subject to instability. This instability manifests itself in transmitters in the form of both sudden and gradual changes in the transmitted frequency, and also in the amplitude of the radiated energy. In receivers, instability shows up in the form of gradual detuning of the radio frequency tuned circuits and, in some circuits such as that of the super-regenerative receiver, it also manifests itself as a gradual or sudden change in the output despite the input energy remaining constant.

Accordingly, the principal object of this invention is to provide a micro-wave radio alarm system which may be used in practical application and which will be operative at all times in spite of the inherent defects mentioned above.

Another object of this invention is to provide a radio alarm system wherein the effects of inherent instability within the alarm apparatus are eliminated.

A further object of this invention is to provide a micro-wave alarm system wherein the receiving circuit is arranged to automatically compensate the effects of instability within the radio apparatus.

Still another object of this invention is to provide in a radio alarm system means for preventing false operation due to movement of reflecting objects within or without the protected area.

Another object of this invention is to provide a means for varying the extent of the protected space and also the shape of the protected space.

A further object of this invention is to provide in a micro-wave alarm system a means for altering the distribution of the wave pattern in the protected space and to alter the sensitivity of any desired portion of the wave pattern to the disturbing effects due to the presence of an intruding body.

A still further object of this invention is to provide a means for maintaining the system in proper adjustment at all times regardless of any rearrangement of furniture or other objects within the protected space subsequent to the original manual adjustment of the system.

Other objects and advantages of this invention will appear from consideration of the following detailed description taken in connection with the drawings wherein:

Fig. 6 shows a circuit diagram of the micro-wave transmitter;

Fig. 7 shows a circuit diagram of the micro-wave receiver;

Fig. 8 shows an alternative arrangement of transmitting and receiving equipment within another enclosure of irregular shape;

Fig. 9 shows a method of concealing the antenna.

Figure 1:
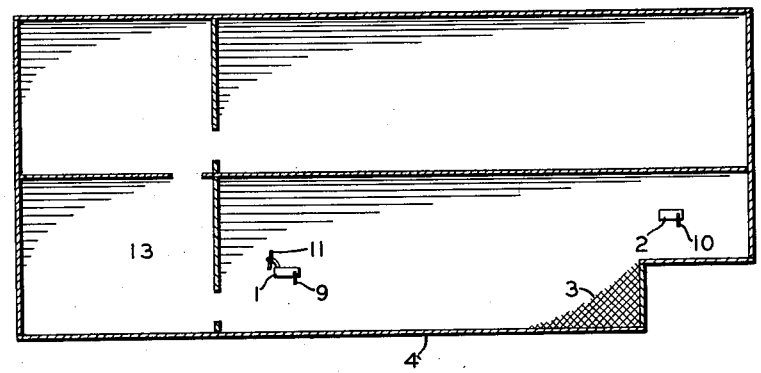
Fig. 1 shows the arrangement of the alarm apparatus within an irregularly shaped enclosure.
Figure 3:
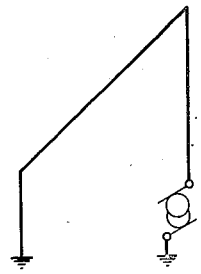
Figs. 3, 4 and 5 show alternative forms of antennae.
Figure 4:
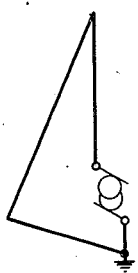
Figure 5:
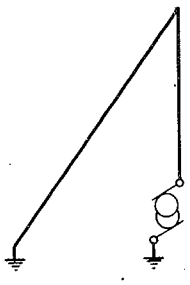

Fig. 1 of the drawings illustrates one possible arrangement of the transmitting and receiving equipment within an enclosure such as the salesroom of a store, or any other room within a building which it may be desired to protect from unauthorized intruders. The transmitter 1 may be arranged at one end of the room 4 while the receiver 2 may be located within the field of radiation of transmitter 1 and at the opposite end of the protected enclosure. Transmitter 1 may be equipped with several forms of short wave radiating antennae such as shown in Figs. 3, 4 and 5 which will radiate short wave energy and thereby create a field of short wave energy within room 4. It is possible, however, that energy from corner 3 will not be received by receiver 2. To remedy this a reflecting device 11 may be placed in such a position with respect to the antenna 9 that the energy radiated from the antenna will be concentrated in any desired field such as corner 3 for affording maximum protection and concentrating the radiated energy to prevent its radiation to external areas such as 13 where protection is unnecessary. The reflector 11 will also direct energy in such a manner that it will be reflected from corner 3 to receiver 2 whereby corner 3 is efficiently protected.

Figure 11:
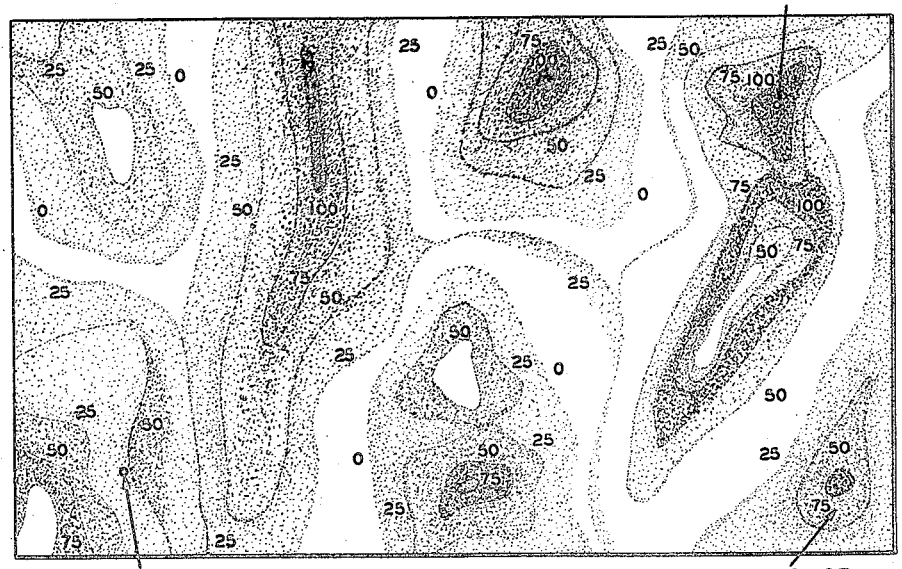
Fig. 11 is a diagram showing the energy distribution within a protected enclosure.

The receiving equipment located at the other end of the alarm field is provided with an antenna 10 for receiving the energy radiated from the transmitter 1. As described above, the transmitter 1 creates a standing wave pattern, such as that shown in Fig. 11 of the drawings, within the alarm field so that any motion of a reflecting object within the alarm field will disturb and alter the standing wave pattern and thereby cause variations in the amount of received energy at the receiver 2. Fig. 11 is intended to show the distribution of radiant energy within a typical room or other enclosure. The transmitting and receiving antennae are shown in these particular positions by way of example only since different enclosures may require that other locations be used in order for the best results to be obtained. Because of absorption, reflection and penetration of the waves by the surrounding walls and objects within an enclosure, it is found that the field strength varies as shown in Fig. 11 and indicated by the shading and the numerals 25, 50 and 100. This pattern may exist in a protected premise as it is left for the night but, when an intruder enters the premises, he absorbs and reflects varying amounts of radiant energy and changes the pattern of the energy field whereby the receiver output varies. The receiver 2, which will be described in detail later, converts the energy changes into useful electrical energy which may be used for the purpose of actuating alarm devices such as bells or lamps situated either in the local premises or at a remote point.

It will be noticed from Fig. 1 that the effective short wave field does not include the entire area of the enclosure, the shaded area 3 being unprotected but this may be remedied by either increasing the energy radiated from the transmitter or by increasing the sensitivity of the receiver 2. However, the amount of energy radiated from the transmitter is limited due to the possibility of penetration of the walls by the radiated energy, which might result in false alarms due to movement of reflecting or absorbing objects outside of the protected enclosure. Therefore, it is necessary to carefully adjust the transmitter and receiver to obtain the maximum alarm field within incurring the liability of false alarms.

In practical use of the micro-wave alarm system, some difficulty has been experienced in protecting irregularly shaped enclosures due to the penetration of the walls by the radiated energy and the resulting false alarms. Fig. 1 shows such an irregularly shaped enclosure having a space 3 therein which would not ordinarily be within the alarm field. It is found, however, that by the use of a reflector 11 the space 3 may be included within the alarm field without incurring penetration of the walls by the radiated energy. Reflector 11 concentrates or reinforces the energy in the space 3 at the expense of surplus energy in the remainder of the room thereby bringing the space within the alarm field and reducing the energy within the remainder of the room to prevent spilling over into the areas external thereto.

There are several forms of reflectors such as 11 in Fig. 1 which may be used for the purpose of redirecting the radiating energy from the antenna 9. For instance reflector 11 may consist of a metallic rod of approximately one-half wave length or more in length, placed parallel to the transmitting antenna 9, or it may be a sheet of metal of various sizes and shapes. The reflector is more effective, however, as the area of the reflecting surface is increased, so that a metal sheet is better than a single half-wave rod. The most effective position for the reflector has been found to be approximately ⅛ of a wave-length behind the antenna but the position necessarily varies depending upon the particular arrangement of the enclosure walls and the objects in the room.

Figure 2:
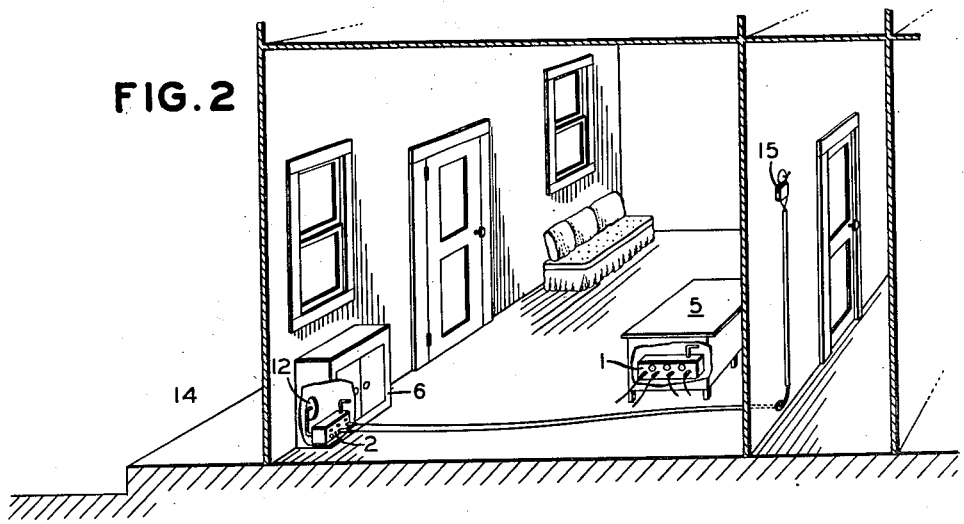
Fig. 2 shows a perspective of an enclosure and the arrangement of the alarm apparatus therein.

Fig. 2 is intended to illustrate the application of the radio alarm system in a room such as would be devoted to office work. The transmitter 1 may be located on one side of the room and concealed in a desk 5, while the receiver may be located within a filing cabinet such as 6 so that there will be no indication that the room contains any form of alarm device. As mentioned before, it is sometimes necessary to prevent reception of energy from areas external to that which it is desired to protect and therefore the receiver 2 may be provided with a reflector 12 which will prevent reception of radiant energy and false alarms from an external area such as that indicated at 14. The receiving device is arranged to actuate an alarm such as 15 which may be in the form of a bell, buzzer, lamp or any other well known alarm device and which may be located outside the protected area as indicated in Fig. 2 or at a central point within the building containing said room. It is also possible to arrange the receiver 2 to control an impulse transmitter of the well known type, which is connected to transmit an alarm to a central office.

Fig. 8 shows an example of an irregularly shaped room which presents a special problem in protection by a micro-wave alarm system. It is evident that such a room could not be protected by means of a single transmitter and receiver since if a transmitter is placed at A in Fig. 8 and the receiver is placed at B, the effective field would not extend very far towards C even with the aid of reflectors. A transmitter might be placed at D and receivers might be placed at B and C so that the entire area of the room would then be in the alarm field. However, a better solution is to place the transmitter apparatus 1 at D and a receiver 2 at E with antennae 10 and 10' at points B and C with connections to the receiver 2 at E which should be concentric cables such as 18 and 19. Thus the antenna 10 at B would receive energy from the transmitter 1 at D thereby protecting the area between the transmitter and this antenna, while the antenna 10' at C would receive energy from the transmitter 1 at D to protect the remainder of the enclosure.

Another alternative would be to place the receiver at point D and the transmitting antennae at both B and C thereby using only one receiving antenna to accomplish the same function. It is now evident that an intruder could not move about within the enclosure without reflecting or absorbing energy and thereby causing an alarm.

It has also been found necessary to control the direction of radiated energy in a horizontal plane to insure that the radiated energy will not create an alarm field which is too high above the floor surface of the room thereby allowing an intruder to move about without causing an alarm. It is possible to overcome this difficulty by means of the various antennae shown in Figs. 3, 4 and 5. Since the energy is radiated from the transmitter at a very high frequency, very pronounced directional effects are obtainable and the antenna will radiate in a plane perpendicular to the plane in which the elements of the antenna lie. Therefore, the adjustment of the antenna governs the height of the alarm field. Fig. 9 shows antenna 10 tilted at an angle to the perpendicular whereby waves will be reflected downwardly into the room to insure interruption by an intruder.

The apparatus shown in Figs. 3, 4, 5 and 9 overcomes another problem in connection with this form of alarm system where energy penetrates the wall of the enclosure. If the radiant energy is directed in a horizontal plane it would be possible that a moving body external to the protected area would absorb or reflect a sufficient amount of energy to cause a false alarm. In order to prevent the radiated energy from penetrating the wall surrounding the protected area, it has been found to be necessary under some conditions to incline the transmitting antenna at some angle from the vertical and pointing away from the wall, as shown in Fig. 9, thereby distributing the energy in a different pattern but directing it in such a direction that false alarms are impossible.

The receiving antenna 10 may be inclined at various angles in order to discriminate against unwanted energy from exterior areas. This may prevent reception of a small part of the useful energy but this condition is not serious since the antenna will still receive its energy from a large proportion of the alarm field and consequently cause alarms at the proper time.

Fig. 6 shows a diagram of the transmitter circuit which is used in Figs. 1 and 2. The transmitter is of the conventional form for generating and transmitting waves of the order of one meter in length or less. The tubes 72 and 73 are connected in push-pull, with the copper tubes 71 and 76 forming the tuned plate and grid circuits respectively. The tubes 72 and 73 may be of any type so long as they are capable of generating wave lengths of the order of one meter or less. The copper tubes 71 and 76 are each approximately one-half wave length long and the cathode lead 74 is also approximately one-half wave length long. Such an arrangement keeps the plate current of tubes 72 and 73 at a minimum for any given radiated output, thereby improving the stability of the circuit. The energy is fed to the radiating antenna 9 through a coupling condenser 70 from the plate tank circuit, the value of grid leak 77 determining the amount of energy generated by the circuit.

The output of tube 72 and 73 is modulated by the potential across the modulating choke 78 which is in turn fed from the audio oscillator 80. The transmitting apparatus transmits short wave energy modulated by the thousand cycle note generated by the oscillator 80.

The receiving circuit is shown diagrammatically in Fig. 7 and consists of a receiving antenna 10 which feeds the received energy into the tuned circuit comprising the coil 18 and condenser 19. The tuned circuit is in turn connected across the input of a conventional detector suitable for operation at the above mentioned short wave lengths. The detector demodulates the carrier and feeds the audio component through suitable stages of amplification and a potentiometer which serves as an overall gain control. The output is then fed to a tuned series arrangement of inductance 45 and condenser 46. A parallel tuned arrangement of inductance 47 and condenser 48 is connected across the circuit for the purpose of discriminating against interfering frequencies which may be radiated by elevators, ignition systems or any sparking contacts, without affecting the legitimate signal. This audio output is then fed into another audio amplifier tube 49 which is capable of producing a large voltage swing across the output choke 52. The audio component of voltage across choke 52 is then applied to choke 54 by means of the coupling condenser 53 and the diode rectifier 57 rectifies this audio voltage, the resulting D. C. voltage appearing across the resistor 55. The condenser 56 is connected in parallel with resistor 55 for the purpose of smoothing out the rectified D. C. pulsations and also for giving the circuit a certain time constant.

The output of the rectifier 57 is coupled through a condenser 58 to an amplifier tube 60, the output of which is connected to the operating coil 64 of a galvanometer relay. The contacts 65, 66 and 67 of the galvanometer relay 64 are arranged in series with battery 69 and signal means 68 in such a manner that the galvanometer relay will close one or the other of its contacts to energize the signal 68, depending upon the polarity of signal voltage on the grid of tube 60.

As mentioned above in connection with the objects of this invention, it is necessary that a workable alarm system of this type should compensate automatically for changes in the position of reflecting or absorbing objects in the enclosure such as pieces of furniture during the daytime or other periods when the system is not protecting the enclosure. The rectifier 57, resistor 55 and the condenser 58 have been provided for the purpose of automatic compensation. During normal operation of the system, there is no change in the wave pattern of the radiating energy in the alarm field, and therefore the received energy is rectified in rectifier 57, the result of which is a constant potential across the resistor 55. Inasmuch as the received energy is constant, the voltage across resistor 55 is normally constant, and therefore the condenser 58 virtually isolates the tube 60 from the remainder of the circuit. Even if there are gradual changes in the value of the rectified voltage across resistor 55, such as might be caused by a frequency drift of the transmitter or such as might be caused by the effects of varying temperature or humidity, these changes are absorbed by condenser 58 and consequently there is no change in potential across the input circuit of tube 60.

However, if an intruder should enter the alarm field or the protected space, the resulting reflection or absorption of radiated energy will cause a change in the received energy which results in a sudden change of voltage across the resistor 55. This change of voltage varies the charge on condenser 58 and therefore applies a change of potential across the grid circuit of tube 60, this voltage being proportional to the change in the rectified voltage produced by the movements of the intruder, and the polarity of this voltage is determined by whether or not the rectified voltage increases or decreases. Thus, as the intruder moves about the protected space, the radio frequency energy received by antenna 10 increases and decreases according to the changes in the standing wave pattern in the protected space; the voltage on the grid of tube 60 and the polarity varying accordingly. The output of tube 60 follows the fluctuations of the modulated radio frequency energy to operate the galvanometer relay 64, which has contacts 65, 66 and 67 for actuating the central office or local alarm device 68 through battery 69. The values of condenser 58 and resistor 59 determine the time constant of the grid circuit of tube 60 and also affect the sensitivity. Tube 60 may be a triode or a multi-grid power amplifier tube. If a multigrid tube is used, the screen voltage should be reduced by resistor 63 to such a value as to give a normal plate current that is just sufficient to keep the galvanometer relay contact 66 centered between contacts 65 and 67. The cathode bias on tube 60 should be a few volts negative to keep the input impedance of the tube at a high value so as not to impair the time constant of the combination condenser 58 and resistor 59.

Figure 10:
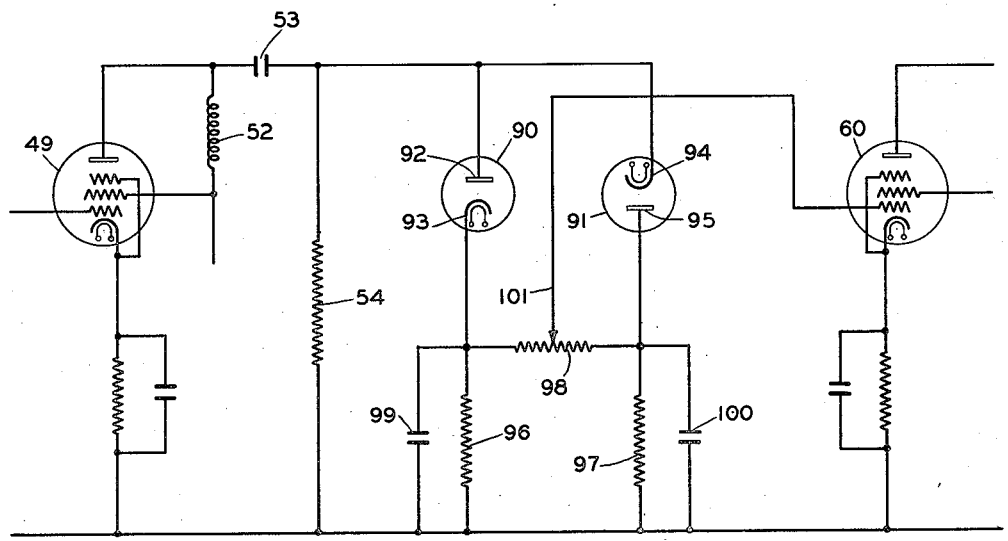
Fig. 10 is a circuit diagram of a modification of the receiving circuit shown in Fig. 7.

An alternative compensating circuit is shown in Fig. 10. In this diagram, the output of tube 49 is fed by means of the coupling devices 53 and 54 to the two diodes 90 and 91. The anode 92 of tube 90 and the cathode 94 of tube 91 are connected together, while the cathode 93 of tube 90 and the anode 95 of tube 91 are connected respectively to resistors 96 and 97, and the other ends of the resistors are connected to ground. Condenser 99, connected across resistor 96, has a much higher capacitance than condenser 100, which is connected across resistor 97. Connecting cathode 93 and anode 95 is a potentiometer 98, whose sliding arm 101 is connected to the grid of the output tube 60.

The operation of this arrangement is as follows:

While a steady audio frequency signal is impressed on the grid of tube 49, the output of the tube is rectified in the normal manner by both diodes 90 and 91. However the rectified voltage appearing across resistor 96 is positive with respect to ground, while the rectified voltage across resistor 97 is negative with respect to ground. These rectified voltages are of the same order of magnitude, though not necessarily equal, and are of opposite polarity. Therefore, the voltage across resistor 98 is equal to the sum of the rectified voltages, and if contact 101 is adjusted approximately to its central position a point will be found where the potential to ground is zero. This is the normal adjustment, and under such condition the voltage applied to the grid of tube 60 will always be zero regardless of the signal output from tube 49, if this signal output remains steady or changes only very gradually.

However, if the signal output of tube 49 were to change suddenly, as would occur if an intruder entered the protected space and upset the standing wave pattern, an unbalanced condition would occur between the voltages rectified by diodes 90 and 91. The voltage across resistor 96 cannot change rapidly because condenser 99 is large enough to have a large time constant in conjunction with resistor 96. On the other hand, the voltage developed across resistor 97 is very responsive to quick variations in the audio frequency output of tube 49 because the time constant of the resistor 97 and condenser 100 circuit is very small. Thus the voltage between contact 101 and cathode 93 would not be affected for several seconds by a change in the signal output of tube 49, but the voltage between contact 101 and anode 95 will vary exactly as the audio frequency signal varies. Therefore, the potential between contact 101 and ground will no longer be zero, but will become positive or negative with respect to ground as the audio frequency signal decreases or increases in amplitude. Thus the voltage on the grid of tube 60 will vary, and cause the tube's plate current to change likewise and so operate the alarm relay.

It is obvious that if the audio frequency signal changes in amplitude very gradually, as would be the case where weather conditions and the like affect the micro-wave transmitter or receiver, the rectified voltage across resistor 96 can follow the changing signal as readily as can the rectified voltage across resistor 97, because the time constant of either diode circuit is much less than the time required for the change in signal amplitude to be completed. The voltage applied to the grid of tube 60 thus remains unchanged at zero volts during the whole period of gradual change of the signal.

The advantage of the above compensating circuit over that depicted in Fig. 7 is that there is no possibility that any voltage will be impressed on the grid of tube 60 other than that caused by a change in signal voltage, so long as there is no appreciable distortion in preceding stages of such a type as to cause the positive half cycles of the audio frequency signals to be amplified either more or less than the negative half cycles. In the compensating circuit shown in Fig. 7, however, if the leakage resistance of condenser 58 is not practically infinite, a portion of the rectified voltage across resistor 55 will appear at the grid of tube 60, thus decreasing the effectiveness of the isolation of tube 60 from preceding stages during periods when the signal voltage is steady, and when the isolation should therefore be complete.

Fig. 9 illustrates one method of concealing an antenna, which is connected to either the transmitter or receiver shown in Figs 1 and 2. Assuming that the antenna is the receiving antenna 10, it is possible to conceal said antenna within a picture frame 16 which may hang upon the wall of the room to be protected. The antenna 10 may be connected to the receiver 2 shown in Fig. 1 by means of the concentric cable 17, which form of cable is particularly adapted for transmitting energy of exceptionally high frequency. This arrangement is particularly useful when it becomes necessary to locate the antenna at a point remote from the transmitter or receiver for the purpose of distributing radiant energy to the desired areas. The arrangement presents the further advantage that the antenna is well concealed whereby an unauthorized intruder cannot ascertain the presence of protective equipment.

From the above description, it is evident that this invention provides a new and improved radio micro-wave alarm system which is capable of operating in a practical manner to protect a given enclosed space without the occurrence of false alarms. Means are provided for varying the area of the protected space to render the system flexible and to enable the protection of irregularly shaped enclosed spaces. The system is further provided with automatic compensation means for compensating changes in the standing wave pattern due to movement of reflecting or absorbing objects such as furniture during the period when the protection is turned off. This automatic compensation circuit may also be applied to any form of signalling circuit wherein similar problems occur. For instance, capacity alarm circuits are subject to temperature and humidity effects which can also be compensated by the above described compensation circuit. In fact all circuits of extreme sensitivity are subject to temperature and humidity conditions and variations of circuit constants may be compensated by the automatic compensation means disclosed herein.

The invention is not intended to be limited to the methods and apparatus described above since further modifications within the scope of the appended claims will be evident to those skilled in the art.

We claim:

1. In an alarm system, an enclosure, a source of ultrahigh frequency radio energy therein having an antenna for forming a standing wave pattern within said enclosure, an ultrahigh frequency radio energy receiving device within said enclosure for receiving radio energy directly from the source and indirectly therefrom as reflected from the walls of or objects within said enclosure, and an alarm device adapted to be energized by said receiving device when an intruder alters the wave pattern within said enclosure, the antenna of said source of radio energy having a portion inclined from the vertical plane to create an alarm field at such a horizontal plane within the enclosure that said intruder will alter the said wave pattern in moving about the enclosed space and to radiate energy at such an angle that the receiving device cannot receive reflected energy from without said enclosure.

2. In a radiant energy burglar alarm system, an enclosure comprising a plurality of separated areas to be protected and an area common thereto, a transmitter in the common area for generating ultrahigh frequency radio energy and creating a protective field in said enclosure, a receiver for utilizing said radio energy and antenna means connected to said receiver and adjacent each of said separated areas for increasing the extent of the protective field over said areas.

3. In a radiant energy burglar alarm system, an enclosure comprising a plurality of separate areas to be protected and an area common thereto, a transmitter for generating ultrahigh frequency radio energy and creating a protective field in said enclosure, an antenna in each of the separate areas connected to said transmitter for radiating energy to each of the separate areas of said enclosure and a receiver in the common area for receiving energy from the separate areas of said enclosure.

4. In combination, means for forming a protective alarm field of ultrahigh frequency radio energy within an enclosure, means for receiving changes of energy from said first means, and means for eliminating the effects resulting from instability of the first and second means comprising a circuit connected to said receiving means and having a large time constant, a second circuit connected to said receiving means having a small time constant and a potentiometer connected between said time constant circuits and so adjusted that signals of long duration resulting from said effects balance one another while signals of short duration cause an unbalance and signal means for responding when unbalance occurs.

5. In combination, means for forming a protective alarm field of ultrahigh frequency radio energy within an enclosure, means for receiving energy from said first means, and means connected to said receiving means for distinguishing between false signals resulting from the effects of instability in said first and second means and alarm signals comprising a circuit which remains in balanced condition during a false signal and is unbalanced by an alarm signal.

6. In an alarm system, an enclosure, a source of ultrahigh frequency radio energy therein including an antenna for forming an alarm field of directly radiated and reflected ultrahigh frequency radio energy within said enclosure, an ultrahigh frequency radio energy receiving device within said enclosure for receiving radio energy from said source and indirectly therefrom as reflected from moving objects within said enclosure, and an alarm device adapted to be energized by said receiving device when an intruder affects said alarm field within said enclosure, said antenna being so inclined from the vertical plane that the angle of reflection of reflected energy may be controlled to prevent reception of said energy from without said enclosure.

7. In an alarm system, an irregularly shaped enclosure including isolated areas and a common area joining the isolated areas, a source of ultrahigh frequency radio energy for forming therein an alarm field composed of directly radiated and reflected ultrahigh frequency radio energy, an ultrahigh frequency radio energy receiving device within said enclosure for receiving energy directly from the source and indirectly therefrom as reflected from the walls of or objects within said enclosure, said receiving device including remote pickup antennas located in each of the isolated areas to receive directly radiated and reflected energy from all parts of said enclosure and an alarm device adapted to be energized by said receiving device when an intruder alters the alarm field within said enclosure.

8. In an alarm system, an enclosure of irregular shape including areas isolated from each other and an area common thereto, means in the common area for transmitting ultrahigh frequency radio energy and creating an alarm field composed of directly radiated and reflected energy throughout said enclosure, an ultrahigh frequency radio energy receiving means in said enclosure, signal means adapted to be energized by said receiving means when an intruder alters the wave pattern within said enclosure and means in each of the isolated areas cooperating with said receiving means for collecting directly radiated and reflected radio energy from all parts of said enclosure.

9. In an alarm system, an enclosure, means therein including an antenna for transmitting ultrahigh frequency radio energy and distributing it within said enclosure and means for receiving said energy and actuating an alarm in response to changes therein, said antenna being disposed to distribute said energy in a manner to prevent reception of energy reflected from objects outside said enclosure and thereby prevent false alarms.

10. In combination, means for distributing ultrahigh frequency radio energy within an enclosure, means for receiving said energy and actuating an alarm in response to changes in said energy and means actuated by said receiving means for eliminating effects resulting from instability of the distributing means or the receiving means and preventing false alarms.

11. In combination, means for forming a protective alarm field of ultrahigh frequency radio energy, a radio energy alarm receiver for receiving said energy, means for amplifying received energy, means for rectifying said energy, a resistance connected to said rectifying means for creating a potential which varies in accordance with the received energy and capacity means connected to said resistance for transmitting signals having a predetermined short time duration whereby false signals of long duration resulting from the effects of instability in said first means and said receiver are not transmitted.

12. In combination, means for forming a protective alarm field of ultrahigh frequency radio energy, a radio energy alarm receiver for receiving said energy, means for amplifying received energy, a first rectifier connected to said amplifying means for converting the output of said means to direct current of predetermined polarity, a resistance-capacity circuit having a predetermined time constant connected to said rectifier for creating an electrical potential, a second rectifier for converting the output of said amplifying means to direct current of the opposite polarity, a second resistance-capacity circuit having a different time constant and connected to the second rectifier for creating a potential of opposite polarity, an output circuit including an alarm and means for coupling the time-constant circuits to the output and balancing said potentials with respect to each other for signals of long time duration resulting from instability of the field forming means and the receiver whereby signals of long time duration are nullified and signals of short duration cause a change of potential in said output circuit.

13. In combination, means for forming a protective alarm field of ultrahigh frequency radio energy within an enclosure, means for receiving said energy from said first means, a circuit connected to said receiving means and having a large time constant, a second circuit connected to said receiving means having a small time constant, means connected between said time constant circuits for balancing out signals of long duration arising as a result of the effects of instability in said first and second means and repeating alarm signals of short duration and signal means connected to said balancing means.

14. In combination, means for forming a protective alarm field of ultrahigh frequency radio energy, a radio energy alarm receiver for receiving said energy, means connected to said receiver for amplifying received energy, means connected to the amplifying means for rectifying said energy, and means responsive to rectified energy for repeating signals having a predetermined duration and trapping signals resulting from the effects of instability in said first means and in said receiver.

15. In combination, means for forming a protective alarm field of ultrahigh frequency radio energy, a radio energy alarm receiver, means for amplifying received energy, a first circuit connected to said amplifying means for converting its output to a potential having certain characteristics, a second circuit connected to said amplifying means for converting its output to a potential having different characteristics, an output circuit and means for coupling said circuits to transmit signals of short duration and to nullify signals of longer duration which arise from the effects of instability in said field forming means and said receiver.

MAXWELL H. A. LINDSAY.
KONSTANTIN WOLOSCHAK.